United States Patent
Aoki (10) Patent No.: US 8,688,323 B2
(45) Date of Patent: Apr. 1, 2014

(54) WIRE HARNESS AND ELECTRONIC DEVICE CONTROL SYSTEM

(75) Inventor: Yoshihito Aoki, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/504,773

(22) PCT Filed: Oct. 26, 2010

(86) PCT No.: PCT/JP2010/069002
§ 371 (c)(1),
(2), (4) Date: Apr. 27, 2012

(87) PCT Pub. No.: WO2011/052608
PCT Pub. Date: May 5, 2011

(65) Prior Publication Data

US 2012/0221201 A1    Aug. 30, 2012

(30) Foreign Application Priority Data

Oct. 28, 2009    (JP) ................. 2009-247543

(51) Int. Cl.
*B60R 16/02*    (2006.01)
*H01B 7/00*    (2006.01)

(52) U.S. Cl.
USPC ................. 701/36; 701/49; 307/9.1

(58) Field of Classification Search
None
See application file for complete search history.

(56) References Cited

U.S. PATENT DOCUMENTS

| | | | | |
|---|---|---|---|---|
| 5,397,247 A | * | 3/1995 | Aoki et al. | 439/496 |
| 5,797,757 A | * | 8/1998 | Aoki | 439/101 |
| 6,490,371 B1 | * | 12/2002 | Aoki et al. | 382/232 |
| 6,728,603 B2 | * | 4/2004 | Pruzan et al. | 701/1 |
| 7,843,164 B2 | * | 11/2010 | Hara et al. | 320/106 |
| 7,899,954 B2 | | 3/2011 | Kanazawa et al. | |
| 2008/0218246 A1 | | 9/2008 | Kanazawa et al. | |
| 2009/0125162 A1 | | 5/2009 | Matsuo | |

FOREIGN PATENT DOCUMENTS

| | | |
|---|---|---|
| JP | 03-200446 A | 9/1991 |
| JP | 10-022006 A | 1/1998 |
| JP | 2006-347258 A | 12/2006 |
| JP | 2008-225673 A | 9/2008 |
| JP | 2009124364 A | 6/2009 |

OTHER PUBLICATIONS

International Search Report (PCT/ISA/210) issued by the International Searching Authority in corresponding International Application No. PCT/JP2010/069002 on Dec. 14, 2010.

Written Opinion (PCT/ISA/237) of the International Searching Authority in corresponding International Application No. PCT/JP2010/069002 on Dec. 14, 2010.

(Continued)

*Primary Examiner* — Helal A Algahaim
*Assistant Examiner* — Rebecca Wagner
(74) *Attorney, Agent, or Firm* — Sughrue Mion, PLLC (57) ABSTRACT

A wire harness includes a standard connection circuit part which connects a standard electronic device and an ECU, and an optional connection circuit part which connects optional electronic devices and the ECU. The optional connection circuit part includes a communication connector which is provided to be connectable to the optional electronic devices, and an optional circuit which connects the ECU to the communication connector. The communication connector performs multiplex communication which multiplexes communication of the optional electronic devices and the ECU.

4 Claims, 5 Drawing Sheets

(56) References Cited

OTHER PUBLICATIONS

Extended European Search Report dated Apr. 17, 2013 issued by the European Patent Office in corresponding European Patent Application No. 10826740.2.

Ewald Schmitt, "Handbuch Kraftfahrzeugelektronik", Sep. 2006, Friedr, Vieweg & Sohn Verlag, Wiesbaden, pp. 196-228, XP002694874.

Office Action in Japanese Patent Application No. 2009-247543 issued on Dec. 17, 2013.

* cited by examiner

WIRE HARNESS AND ELECTRONIC DEVICE CONTROL SYSTEM

TECHNICAL FIELD

The present invention relates to a wire harness which communicably connects a plurality of electronic devices that is mounted in a vehicle and an electronic control unit which controls these electronic devices, and an electronic device control system including the wire harness.

BACKGROUND ART

Various electronic devices such as an air conditioner, a windshield wiper or a power window are mounted in a vehicle, such as a passenger car or a freight car. These electronic devices are electrically connected with an electronic control unit (ECU), which includes a computer or the like, and a wire harness. Power and control signals are transmitted between these electronic devices and the ECU via the wire harness. The wire harness is provided with a plurality of electric wires and connectors which accommodate the terminal metal fittings connected to the terminals of the electric wires.

Conventionally, the ECU is provided with input/output parts for every electronic device connected to the ECU. Since connection circuits (namely, electric wires) exclusive for every electronic device are needed, the circuit number of the wire harness (namely, the number of electric wires) which connects the ECU and the electronic devices increases as the number of the electronic devices controlled by the ECU increases. Therefore, there are problems that the cost of the wire harness increases, the wire harness is hardly routed and the weight of the wire harness increases. Further, besides electronic devices that are normally mounted in a vehicle (namely, electronic devices indispensably mounted in a vehicle, hereinafter referred to as "standard electronic devices"), there are electronic devices that are mounted as optional equipments (that is, electronic devices optionally mounted in the vehicle, hereinafter referred to as "optional electronic devices") in the vehicle. For every combination of electronic devices mounted in a vehicle, a wire harness provided with different circuits needs to be prepared, and there are problems that the types of wire harnesses increase and the cost increases.

A technique which solves these problems is proposed by the present applicant in Patent Literature 1. A wire harness, which is included in an electronic device control system shown in Patent Literature 1, is provided with a relay connector unit which relays the communication of the plurality of electronic devices and the ECU and is provided with a communication control function. The relay connector unit is provided with a plurality of circuits (terminals) to which the electronic devices are connected. By referring to circuit identification data contained in information received from the ECU, the relay connector unit transmits the information to the electronic device connected to the circuit which the circuit identification data indicates. The relay connector unit adds to information received from an electronic device the circuit identification data which indicates the circuit to which the electronic device is connected, and transmits to the ECU.

Thus, since the relay connector unit which has a communication control function is provided in the wire harness, and the ECU and the plurality of electronic devices are connected via the relay connector unit, the communication of the ECU and the plurality of electronic devices is multiplexed. Therefore, the ECU and the plurality of electronic devices can be connected by using a common circuit, and the circuit number of the wire harness can be reduced. When the combination of the mounted electronic devices (that is, the combination of optional electronic devices) is changed, it is possible to only change the connection circuit of the wire harness which is connected between the optional electronic devices and the relay connector unit. Therefore, even when the combination of optional electronic devices is changed, the circuit of the wire harness which is connected between the ECU and the relay connector unit can be commonly used without being changed. In this way, the problems which are mentioned above, such as the cost increase of the wire harness, the difficulty in arranging the wire harness and the increase of the weight of the wire harness, can be solved.

CITATION LIST

Patent Literature

Patent Literature 1: JP-A-2008-225673

SUMMARY OF INVENTION

Technical Problem

However, in the electronic device control system of Patent Literature 1, since the standard electronic devices and the optional electronic devices are connected via the relay connector units commonly, these standard electronic devices and optional electronic devices are commonly controlled by one control unit with which the ECU is provided. Therefore, for every combination of a plurality of electronic devices mounted in a vehicle, it is necessary to make the ECU to be provided with a control unit corresponding to the combination of these electronic devices, and since it becomes difficult to standardize the ECU, there are problems that the kinds of ECUs will increase and the cost will increase.

An object of the invention is to solve the above problems. Namely, the invention is intended to provide a wire harness and an electronic device control system which includes the wire harness, so that while the functions with which an electronic control unit is provided can be standardized, circuits can be used commonly without being changed even when the combination of a plurality of electronic devices mounted in a vehicle is changed.

Solution to Problem

In order to achieve the object, according to a first aspect of the invention, there is provided a wire harness for communicably connecting a plurality of electronic devices which are mounted in a vehicle and an electronic control unit which controls the electronic devices, the wire harness including: a standard connection circuit part which connects the electronic control unit and a standard electronic device which is indispensably mounted in the vehicle among the plurality of electronic devices; and an optional connection circuit part which connects the electronic control unit and optional electronic devices which are optionally mounted in the vehicle among the plurality of electronic devices, wherein the optional connection circuit part includes a communication connector which is provided to be connectable to one or more of the optional electronic devices, and a connection circuit which connects the communication connector to the electronic control unit, and the communication connector is configured to perform multiplex communication which multiplexes communication of the more of the optional electronic devices which are connected to the communication connector and the electronic control unit, with the electronic control unit via the connection circuit.

According to the first aspect of the invention, the standard connection circuit part which connects the standard electronic devices and the electronic control unit, and the optional connection circuit part which connects the optional electronic devices and the electronic control unit are separately provided. The optional connection circuit part has the communication connector which is provided to be connectable with one or more of the optional electronic devices, and the connection circuit which connects the communication connector to the electronic control unit. Further, the communication connector performs multiplex communication, which multiplexes the communication of the plurality of optional electronic devices which are connected to the communication connector and the electronic control unit, with the electronic control unit via the connection circuit.

In order to achieve the object, according to a second aspect of the invention, there is provided an electronic device control system which includes a plurality of electronic devices mounted in a vehicle, an electronic control unit which controls the plurality of electronic devices, and a wire harness which communicably connects the plurality of electronic devices and the electronic control unit, wherein the wire harness includes the wire harness as defined in the first aspect, the electronic control unit includes a standard electronic device control unit which controls the standard electronic devices, and an optional electronic device control unit which controls the optional electronic devices, the standard electronic device control unit is connected with the standard electronic devices through the standard connection circuit part, and the optional electronic device control unit is connected with the optional electronic devices through the optional connection circuit part.

According to the second aspect of the invention, the standard electronic device control unit of the electronic control unit is connected with the standard electronic devices through the standard connection circuit part of the wire harness, and the optional electronic device control unit of the electronic control unit is connected with the optional electronic devices through the optional connection circuit part of the wire harness.

Advantageous Effects of Invention

According to the first aspect of the invention, since the standard connection circuit part which connects the standard electronic devices and the electronic control unit, and the optional connection circuit part which connects the optional electronic devices and the electronic control unit are separately provided, the control unit (the standard electronic device control unit) which controls the standard electronic devices and the control unit (the optional electronic device control unit) which controls the optional electronic devices can be separately provided, respectively, in the electronic control unit to which the wire harness is connected. Therefore, even when the combination of a plurality of electronic devices mounted in a vehicle is changed, it is possible to only change the control unit which controls the optional electronic devices in the electronic control unit. Therefore, it is possible to standardize the control unit which controls the standard electronic devices (namely, function), the design and productivity can be improved and the cost can be lowered.

The optional connection circuit part has the communication connector which is provided to be connectable with one or more of the optional electronic devices, and the connection circuit which connects the communication connector to the electronic control unit. Further, the communication connector performs multiplex communication, which multiplexes the communication of the plurality of optional electronic devices which are connected to the communication connector and the electronic control unit, with the electronic control unit via the connection circuit. Therefore, communications of the plurality of optional electronic devices and the electronic control unit can be performed by using the connection circuit commonly. Therefore, even when the combination of a plurality of electronic devices mounted in a vehicle is changed, namely, when the combination of the optional electronic devices connected to the communication connector is changed, the electronic control unit and the plurality of optional electronic devices can be connected to each other by only changing the connection between the communication connector and the optional electronic devices, without changing the optional connection circuit part. Therefore, when the combination of a plurality of electronic devices mounted in the vehicle is changed, the standard connection circuit part and the optional connection circuit part can be used commonly without being changed. The design and the productivity can be improved, and the cost can be reduced.

According to the second aspect of the invention, the standard electronic device control unit of the electronic control unit is connected with the standard electronic devices through the standard connection circuit part of the wire harness, and the optional electronic device control unit of the electronic control unit is connected with the optional electronic devices through the optional connection circuit part of the wire harness. Thus, the control unit which controls standard electronic devices and the control unit which controls optional electronic devices can be separately provided, respectively, and therefore the standard electronic device control unit which controls standard electronic devices can be standardized. Since the communication connector of the wire harness and the electronic control unit are connected through the connection circuit in a multiplex communication way, even when the combination of the electronic devices mounted in the vehicle is changed, the wire harness (namely, the standard connection circuit part and the optional connection circuit part) can be used commonly without being changed. Therefore, the design and productivity can be improved and the cost can be reduced.

DESCRIPTION OF EMBODIMENTS

Next, one embodiment of an electronic device control system and a wire harness according to the invention is described with reference to FIGS. 1 to 3.

Figure 1:
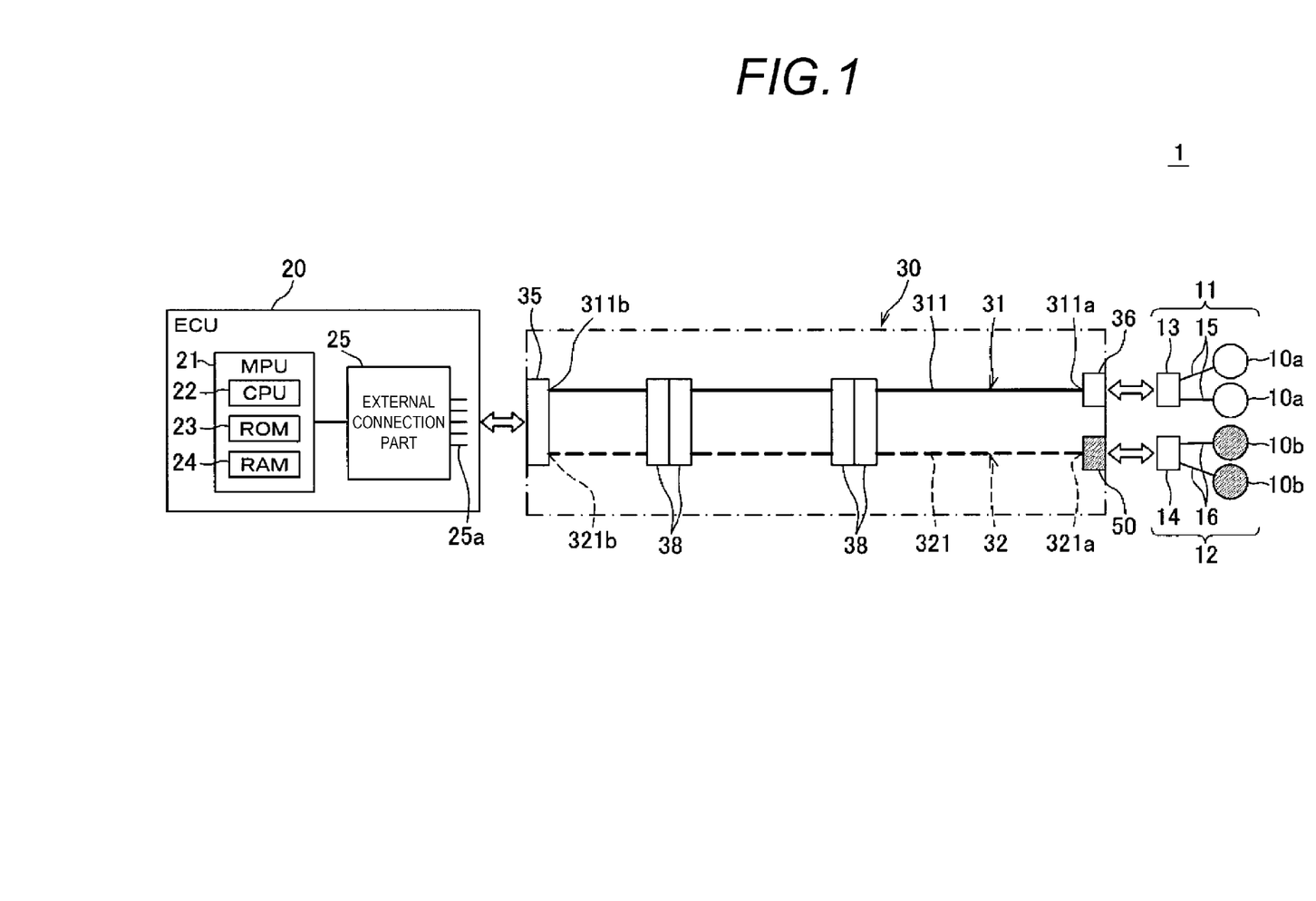
FIG. 1 is a diagram which explains a structure of a wire harness and an electronic device control system according to one embodiment of the invention.

The electronic device control system 1 shown in FIG. 1 is mounted in a vehicle which is not shown in the figure. The electronic device control system 1 is provided with a standard electronic device unit 11, an optional electronic device unit 12, an electronic control unit (ECU) 20, and a wire harness 30. The electronic device control system 1 is a system in which the standard electronic device unit 11 and the optional electronic device unit 12 are provided with a plurality of electronic devices 10 which are provided at any locations in the vehicle, and are communicably connected with the ECU 20 through the wire harness 30 so that the plurality of electronic devices 10 are controlled by the ECU 20.

The plurality of electronic devices 10 are various devices to be controlled by the ECU 20, and are divided and classified as standard electronic devices 10a which are indispensably mounted in the vehicle, and optional electronic devices 10b which are optionally mounted in the vehicle. As the standard electronic devices 10a, for example, a door switch, a door lock status switch, a door key control unit and a power window are included. As the optional electronic devices 10b, a door mirror closing device, a door mirror angle adjusting device, a door mirror cloudy weather stop equipment and the like are included. Although these electronic devices 10 that are allocated near the doors of the vehicle are listed as examples, various electronic devices 10 besides these are also mounted in the vehicle. Each of the electronic devices 10 is provided with an operation part (not shown in the figure), such as a switch or an actuator, and a control part (not shown in the figure) which acquires the ON/OFF status of the switch or controls the driving of the actuator.

The standard electronic device unit 11 is provided with a plurality of the above-mentioned standard electronic devices 10a, a connector 13, and a plurality of cables 15. The connection connector 13 is a so-called female connector and includes a plurality of female terminal metal fittings and a housing in which the metal fittings are accommodated. One end of each of the plurality of cables 15 is connected to the control part of the respective standard electronic device 10a, (not shown) and the other end is connected to the terminal metal fitting of the connection connector 13 which is assigned to the respective standard electronic device 10a beforehand. The connection connector 13 is fitted into a standard electronic device connecting connector 36 which is described later.

The optional electronic device unit 12 is provided with a plurality of the above-mentioned optional electronic devices 10b, a connector 14 and a plurality of cables 16. The connection connector 14 is a so-called female connector and includes a plurality of female terminal metal fittings not shown) and a housing in which the metal fittings are accommodated. One end of each of the plurality of cables 16 is connected to the control part of the respective optional electronic device 10b, and the other end is connected to the terminal metal fitting of the connection connector 14 which is assigned to the respective optional electronic device 10b beforehand. The connection connector 14 is fitted into an optional electronic device connecting connector 50 (communication connector) which is described later.

The ECU 20 has a box-like casing which is not shown in the figure, and a microprocessor (MPU) 21 which is accommodated in the box-like casing and operates according to a program defined beforehand. The MPU 21 has, as is well known, a central processing unit (CPU) 22 which performs various kinds of processes and controls according to the program defined beforehand, a ROM 23 which is a read-only memory that stores the program for the processing of the CPU 22 and various information, and a RAM 24 which is a readable and writable memory that stores various kinds of data and has an area required for the processing of the CPU 22. The processing program which makes the CPU 22 function as a standard electronic device control unit which controls the standard electronic devices 10a and the processing program which makes the CPU 22 function as an optional electronic device control unit which controls the optional electronic devices 10b are independently stored in the ROM 23, respectively. The CPU 22 functions as a standard electronic device control unit and an optional electronic device control unit by executing these processing programs.

The ECU 20 further has an external connection part 25. The external connection part 25 has a first communication interface which is connected to the above-mentioned CPU 22 (namely, the standard electronic device control unit) to perform 1 to 1 communication with the standard electronic devices, and a second communication interface which is connected to the above-mentioned CPU 22 (namely, the optional electronic device control unit) to perform multiplex communication with the optional electronic devices according to a predetermined communication protocol (for example, LIN (Local Interconnect Network)). A plurality of male terminals 25a connected to these communication interfaces are provided in the external connection part 25.

The wire harness 30 is provided with a standard connection circuit part 31, an optional connection circuit part 32, and an ECU connection connector 35.

The standard connection circuit part 31 is a circuit part which connects the standard electronic devices 10a which are indispensably mounted in the vehicle among the plurality of electronic devices 10 mounted in the vehicle, and the ECU 20 so that the 1 to 1 communication of the standard electronic devices 10a and the ECU 20 becomes possible. The standard connection circuit part 31 is provided with a standard circuit 311 and a standard electronic device connecting connector 36 which is provided at one terminal 311a of the standard circuit 311.

The standard circuit 311 includes a plurality of electric wires. The plurality of electric wires are so-called covered electric wires which are provided with conductive core wires and insulating covered parts which are covered on the core wires. The standard circuit 311 has connection circuits which correspond to the respective standard electronic devices 10a and are connected through the standard electronic device connecting connector 36. That is, the connection circuit exclusive for each of the standard electronic devices 10a which includes controlling signal lines required for connection and power supply lines is provided in the standard circuit 311.

The standard electronic device connecting connector 36 is a usual so-called male connector which includes a male terminal metal fitting that is connected to the one terminal 311a of the standard circuit 311, and a housing which accommodates the terminal metal fitting. The male terminal metal fitting, which the standard electronic device connecting connector 36 is provided with, is electrically connected to a female terminal metal fitting, which the connection connector 13 is provided with, by fitting the female connection connector 13, which the standard electronic device unit 11 is provided with, into the standard electronic device connecting connector 36. Therefore, the standard electronic devices 10a, which the standard electronic device unit 11 is provided with, are electrically connected to the connection circuits of the standard circuit 311 corresponding to these standard electronic devices 10a, respectively.

The optional connection circuit part 32 is a circuit part which connects the optional electronic devices 10b which are optionally mounted in the vehicle among the plurality of electronic devices 10 mounted in the vehicle, and the ECU 20 so that the multiplex communication of the optional electronic devices 10b and the ECU 20 becomes possible. Here, the multiplex communication (namely, communication multiplexing) refers to the multiple communications performed between the plurality of optional electronic devices 10b and the ECU 20 (namely, multiple communication connections respectively established between the plurality of optional electronic devices 10b and the ECU 20) by using a common connection circuit (namely, one transmission line). The optional connection circuit part 32 is provided with an optional circuit 321 and an optional electronic device connecting connector (hereinafter referred to as "communication connector") 50 which is provided at one terminal 321a of the optional circuit 321 and has a built-in communication function.

The optional circuit 321 includes the same plurality of electric wires as the standard circuit 311. The optional circuit 321 is a connection circuit which connects the communication connector 50 and the ECU 20, and is provided with controlling signal lines which are required for the communication to be performed between the communication connector 50 and the ECU 20, and power supply lines. For example, the well known LIN is adopted as a protocol for the communication performed between the communication connector 50 and the ECU 20, and the controlling signal lines which are required for the communication protocol are provided in the optional circuit 321. Of course, other communication protocols, such as CAN (Controller Area Network), may be adopted as the communications protocol.

Figure 2:
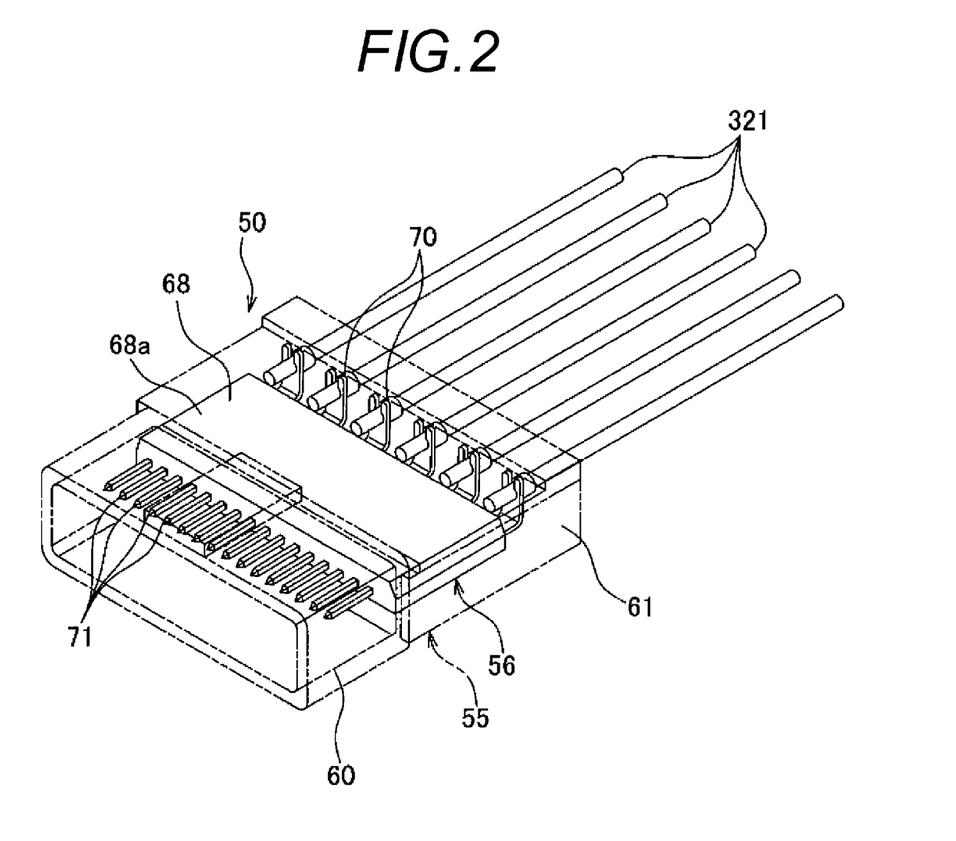
FIG. 2 is a diagram which explains a structure of an optional electronic device connecting connector (communication connector) of electronic devices with which the wire harness of FIG. 1 is provided.

As shown in FIG. 2, the communication connector 50 includes an outer housing 55, and a control circuit package 56 which is accommodated in the outer housing 55. The outer housing 55 is formed by using insulating synthetic resin to have a flat casing shape, and is integrally provided with a pipe-like hood 60 and a control circuit package accommodating house 61 which is coupled to the hood 60.

The control circuit package 56 is accommodated in the control circuit package accommodating houses 61 of the outer housing 55, and is provided with a plurality of press-contact terminals 70, a plurality of male tabs 71, and a resin sealing body 68.

The plurality of press-contact terminals 70 are provided in parallel, and each of the plurality of press-contact terminals 70 is formed to have a roughly L shape by bending a flat plate. One end of the press-contact terminal 70 is electrically connected to a lead frame, which the resin sealing body 68 is provided with, and the other end turns upwards in FIG. 2. A pair of press-contact blades are provided opposite to each other in the widthwise direction at the other end of the press-contact terminal 70, and the electric wire which forms the optional circuit 321 is pushed between the pair of press-contact blades and is press-contacted so that the press-contact terminal 70 and the optional circuit 321 are electrically connected.

The plurality of male tabs 71 are formed to have a rod shape which extends along a straight line, and are provided in parallel and in a row by being spaced from each other. The plurality of male tabs 71 are provided so that the number of the male tabs 71 may correspond to the maximum number of the optional electronic devices 10b which are assumed to be connected. When the number of the connected optional electronic devices 10b is less than the above-mentioned maximum number, the male tabs 71 that correspond to the optional electronic devices 10b which are not mounted in the vehicle become vacant (a state that nothing is connected at all). The male tabs 71 are grouped so that each group has a plurality of male tabs for each of the optional electronic devices 10b which the male tabs 71 are connected to, and circuit identification data, which are mutually different, are beforehand assigned to each group of these grouped male tabs 71. One end of each of the plurality of male tabs 71 is electrically connected to the lead frame which the resin sealing body 68 is provided with, and the other end is provided in the hood 60 by being turned to the opening of the hood 60. Thus, the plurality of male tabs 71 will be electrically connected with the female terminal metal fittings (not shown in the figure) of the connection connector 14 when the connection connector 14, which the optional electronic device unit 12 is provided with, is fitted into the hood 60. In this way, the respective optional electronic devices 10b, which the optional electronic device unit 12 is provided with, are electrically connected with the male tabs 71 respectively corresponding to these optional electronic devices 10b.

The resin sealing body 68 is provided with the lead frame which is not shown in the figure, an IC chip which is attached to the lead frame and is not shown in the figure, and a body part 68a which is formed of synthetic resin, has a flat rectangular shape, and seals the lead frame and the IC chip. The lead frame and the IC chip are electrically connected to each other by well known bonding wires. That is, the IC chip and the plurality of press-contact terminals 70 are electrically connected, and the IC chip and the plurality of male tabs 71 are electrically connected. The resin sealing body 68 is arranged between the plurality of press-contact terminals 70 and the plurality of male tabs 71.

The IC chip is a well-known microcomputer and is provided with a central processing unit (CPU), a ROM which is a read-only memory, and a RAM which is a memory in which read-out and rewriting are possible. The CPU is responsible for various controls in the communication connector 50, performs various processes, such as communication processes and communication multiplexing processes, according to various processing programs stored in the ROM, and functions as various means, such as a communication means and a communication multiplexing means. The ROM stores various information such as the above-mentioned processing programs and a unique communication address which is set to the communication connector 50 beforehand.

Since the IC chip is included, the communication connector 50 has a communication function for performing communication with the ECU 20 via the optional circuit 321, and a communication multiplexing function for connecting the plurality of optional electronic devices 10b and the ECU 20 so that communication is possible by using the optional circuit 321 commonly. Namely, the communication connector 50 has a communication control unit (namely, a communication means and a communication multiplexing means) that performs the multiplex communication, which multiplexes the communication of the plurality of optional electronic devices 10b which are connected to the communication connector 50 and the electronic control unit 20, with the electronic control unit 20 via the optional circuit 321 (namely, the connection circuit).

In particular, the IC chip (1) receives control information (hereinafter referred to as "the first information") from the ECU 20 via the optional circuit 321 and the plurality of press-contact terminals 70, and judges the address data contained in the first information, (2) when the address data do not indicate its own communication address, discards the first information, (3) when the address data indicate its own communication address, (4) outputs the first information from the group of male tabs 71 which the circuit identification data further contained in the first information indicate, and transmits the first information to the optional electronic devices 10b connected to the group of male tabs 71.

Further, the IC chip (5) receives control information (hereinafter referred to as "the second information") from the optional electronic devices 10b via the male tabs 71, (6) adds the circuit identification data which indicate the group of male tabs 71 which receives the second information to the second information, and then (7) further adds the address information which indicate its own communication address, outputs from the press-contact terminals 70, and transmits to the ECU 20. The above (1) to (3) and (7) are equivalent to the communication function which the communication connector 50 is provided with, and the above (4) to (6) are equivalent to the communication multiplexing function. When a plurality of communication connectors 50 are provided in the optional circuit 321, the communication function is equivalent to a communication multiplexing function (that is, the multiple communications of the plurality of communication connectors 50 and the ECU 20 are multiplexed).

Namely, the communication connector 50 transmits the first information which are received from the ECU 20 to the optional electronic devices 10b corresponding to the identification data contained in the first information (namely, the circuit identification data), adds the identification data (namely, the circuit identification data) corresponding to the optional electronic devices 10b to the second information which are received from the optional electronic devices 10b, and then transmits to the ECU 20.

The plurality of electric wires which the above-mentioned standard circuit 311 and the optional circuit 321 include are bundled by a plurality of restricting members, such as bands or tapes, which are not shown in the figure and which are placed at intervals along the longitudinal direction of the electric wires. Further, the plurality of electric wires may be bundled by being inserted into well known corrugated tubes. The electric wires, as shown in FIG. 1, are divided into a plurality of sections, and relay connectors 38 are formed at the ends of the sections other than the two terminals of the electric wires. The continuous standard circuit 311 and the continuous optional circuit 321 are formed by connecting the plurality of sections of the electric wires with each other by fitting these relay connectors 38 to each other. Of course, the standard circuit 311 and the optional circuit 321 may be formed by using one continuous electric wire, instead of the electric wires which are divided into a plurality of sections. The electric wires may be formed by being branched halfway, and the formation is arbitrary as long as the purpose of the invention is achieved. The standard circuit 311 and the optional circuit 321 should at least be divided logically. For example, the standard circuit 311 and the optional circuit 321 do not need to be provided physically independently, for example, bundled separately.

The ECU connection connector 35 is a so-called female connector, and is provided with female terminal metal fittings provided at the other terminal 311b of the standard circuit 311 and the other terminal 321b of the optional circuit 321, and a housing in which the terminal metal fittings are accommodated. By fitting the ECU connection connector 35 to the ECU 20, the female terminal metal fittings connected to the standard circuit 311 are electrically connected to the male terminals among the plurality of male terminals 25a that are connected to the first communication interface, and the female terminal metal fittings connected to the optional circuit 321 are electrically connected to the male terminals among the plurality of male terminals 25a that are connected to the second communication interface. Therefore, the CPU 22 of the ECU 20 (namely, the standard electronic device control unit) is connected with the standard electronic devices 10a via the standard connection circuit part 31 so that 1 to 1 communication is possible, and the CPU 22 (namely, the optional electronic device control unit) is connected with the optional electronic devices 10b via the optional connection circuit part 32 so that multiplex communication is possible.

Next, operations of the above-mentioned electronic device control system 1 and the effects of the invention are explained with reference to FIG. 3.

Figure 3:
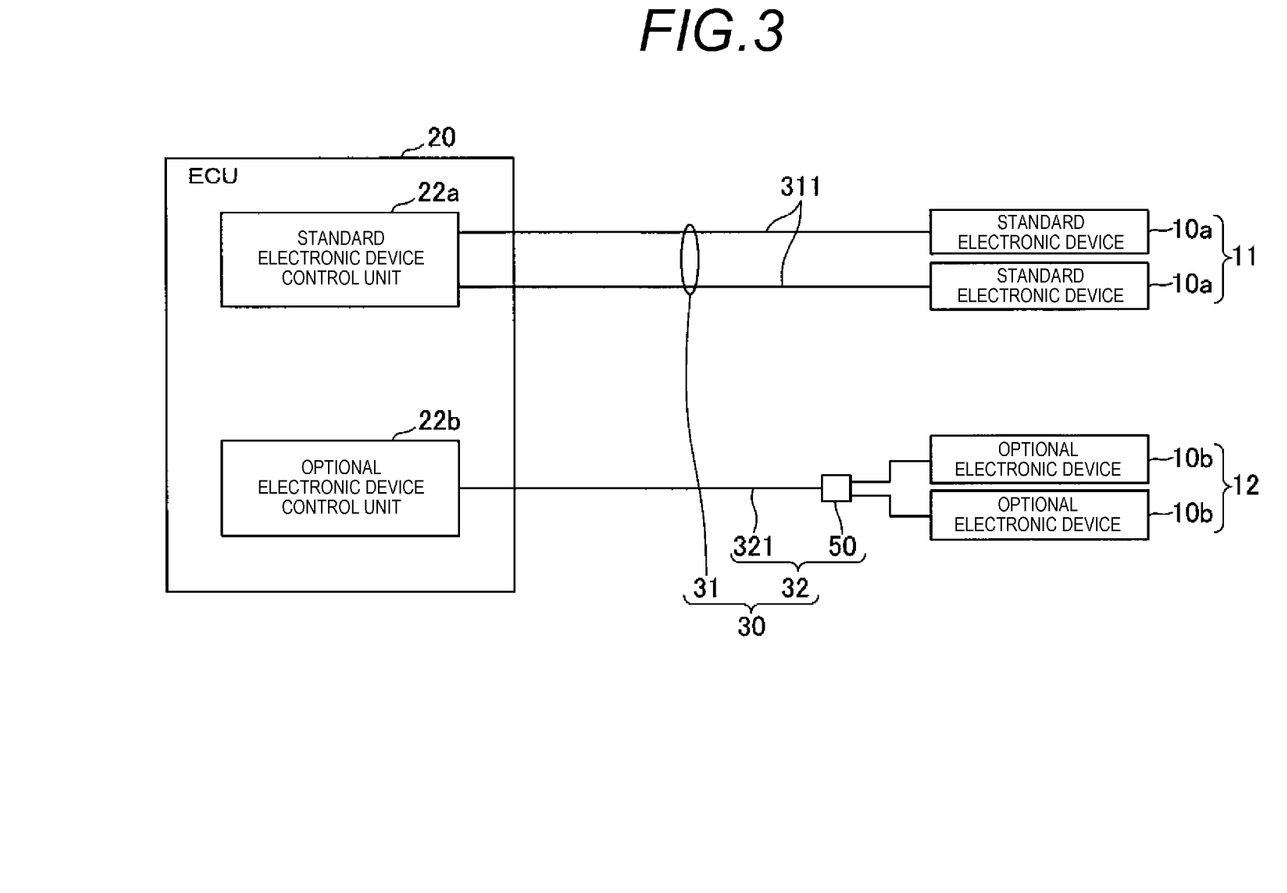
FIG. 3 is a functional block diagram of the electronic device control system of FIG. 1.

The functional block diagram of the electronic device control system 1 is shown in FIG. 3. The ECU 20 is provided with a standard electronic device control unit 22a which is formed by the CPU 22 and an optional electronic device control unit 22b which is similarly formed by the CPU 22. The standard electronic device control unit 22a and the optional electronic device control unit 22b are provided logically independently. In particular, the processing program used for the control of the standard electronic device 10a performed in the CPU 22 and the processing program used for the control of the optional electronic device 10b performed in the CPU 22 are stored so that it is possible to divide the above programs independently, and the CPU 22 functions as the standard electronic device control unit 22a and the optional electronic device control unit 22b by executing these processing programs, respectively.

The standard electronic device control unit 22a is connected to each of the standard electronic devices 10a in a 1 to 1 way through exclusive connection circuits which are provided in the standard circuit 311 of the standard connection circuit part 31 corresponding to the respective standard electronic devices 10a.

When the standard electronic device control unit 22a transmits control information to a standard electronic device 10a which is a controlled object, the standard electronic device control unit 22a transmits the control information through the connection circuit corresponding to the standard electronic device 10a. Based on the connection circuit which receives the control information from the standard electronic device 10a, the standard electronic device control unit 22a recognizes the standard electronic device 10a corresponding to the connection circuit, and performs processes according to the received control information.

The optional electronic device control unit 22b is connected with the communication connector 50 via the optional connection circuit part 32. The communication connector 50 is connected with the plurality of optional electronic devices 10b. That is, the optional electronic device control unit 22b is connected with the plurality of optional electronic devices 10b by sandwiching the communication connector 50 in between.

When the optional electronic device control unit 22b transmits control information (the first information) to an optional electronic device 10b as a controlled object, the optional electronic device control unit 22b adds the identification data corresponding to the optional electronic device 10b as the controlled object (namely, the circuit identification data which indicate the group of male tabs 71 of the communication connector 50 to which the optional electronic device 10b is connected) to the control information, further adds the address data which indicates the inherent communication address of the communication connector 50, and then transmits to the communication connector 50 through the optional connection circuit part 32.

When the optional electronic device control unit 22b receives control information (the second information) from the communication connector 50, based on the address information and identification data which are contained in the control information, the optional electronic device control unit 22b recognizes the optional electronic device 10b which is the transmission source of the control information, and performs processes according to the received control information. When the optional electronic device control unit 22b cannot recognize an optional electronic device 10b which is the transmission source of the control information, the control information is discarded as an invalid one.

Thus, in the electronic device control system 1, when the combination of a plurality of electronic devices 10 is changed, namely, when the combination of the optional electronic devices 10b connected to the communication connector 50 is changed, the number or the kinds of the optional electronic devices 10b with which the optional electronic device unit 12 is provided is changed according to the change of the combination, and the optional electronic devices 10b of the new combination are connected to the connection connector 14 through the cable 16. The optional electronic device control unit 22b (namely, the processing programs stored in the ROM 23 and used for the control of the optional electronic devices 10b performed in the CPU 22) of the ECU 20 is changed according to the optional electronic devices 10b of the new combination. The standard electronic device control unit 22a, the standard connection circuit part 31, the standard electronic device unit 11 and the optional connection circuit part 32 other than these remain unchanged.

As mentioned above, according to the embodiment, the standard connection circuit part 31 which connects the standard electronic devices 10a and the electronic control unit 20, and the optional connection circuit part 32 which connects the optional electronic devices 10b and the electronic control unit 20 are separately provided in the wire harness 30. The optional connection circuit part 32 has the communication connector 50 which is provided to be connectable with the plurality of optional electronic devices 10b, and the optional circuit 321 as a connection circuit which connects the communication connector 50 to the electronic control unit 20. The communication connector 50 performs multiplex communication, which multiplexes the communication of the plurality of optional electronic devices 10b and the electronic control unit 20 which are connected to the communication connector 50, with the electronic control unit 20 via the optional circuit 321.

The standard electronic device control unit 22a of the electronic control unit 20 is connected with the standard electronic devices 10a through the standard connection circuit part 31 of the wire harness 30, and the optional electronic device control unit 22b of the electronic control unit 20 is connected with the optional electronic devices 10b through the optional connection circuit part 32 of the wire harness 30.

As mentioned above, according to the invention, since the standard connection circuit part 31 which connects the standard electronic devices 10a and the electronic control unit 20 and the optional connection circuit part 32 which connects the optional electronic devices 10b and the electronic control unit 20 are provided separately, in the electronic control unit 20 to which the wire harness 30 is connected, the control unit (the standard electronic device control unit) which controls the standard electronic devices 10a and the control unit (the optional electronic device control unit) which controls the optional electronic devices 10b can be separately provided, respectively. Therefore, even when the combination of a plurality of electronic devices 10 mounted in a vehicle is changed, it is possible to only change the optional electronic device control unit 22b in the electronic control unit 20. Therefore, it is possible to standardize the standard electronic device control unit 22a, the design and productivity can be improved and the cost can be lowered.

The optional connection circuit part 32 has the communication connector 50 which is provided to be connectable with the plurality of optional electronic devices 10b, and the optional circuit 321 which connects the communication connector 50 to the electronic control unit 20. Thus, since the communication connector 50 performs multiplex communication which multiplexes the communication of the plurality of optional electronic devices 10b which are connected to the communication connector 50 and the electronic control unit 20, with the electronic control unit 20 via the optional circuit 321, communications of the plurality of optional electronic devices 10b and the electronic control unit 20 can be performed by using the optional circuit 321 commonly. Therefore, even when the combination of a plurality of electronic devices 10 mounted in a vehicle is changed, namely, when the combination of the optional electronic devices 10b connected to the communication connector 50 is changed, the electronic control unit 20 and the plurality of optional electronic devices 10b can be connected to each other by only changing the connection between the optional electronic devices 10b and the communication connector 50, without changing the optional connection circuit part 32. Therefore, when the combination of a plurality of electronic devices 10 mounted in the vehicle is changed, the standard connection circuit part 31 and the optional connection circuit part 32 can be used commonly without being changed. The design and the productivity can be improved, and the cost can be reduced.

Although the standard connection circuit part 31 is provided with only one standard electronic device connecting connector 36 in this embodiment, the invention is not limited to this, and the standard connection circuit part 31 may be provided with a plurality of standard electronic device connecting connectors 36. In the standard connection circuit part 31, besides the standard electronic device connecting connector 36, for example, a press-contact terminal may be provided at the end of the standard circuit 311, and the cable 15 of the standard electronic device 11 may be pressed and fitted to the press-contact terminal, or the standard circuit 311 and the cable 15 of the standard electronic device unit 11 may be directly soldered. The connecting means is arbitrary as long as the purpose of the invention is achieved. Although the optional connection circuit part 32 is provided with only one communication connector 50, the invention is not limited to this, and the optional connection circuit part 32 may be provided with a plurality of communication connectors 50.

In this embodiment, the communication connector 50 is provided to be connectable with a plurality of optional electronic devices, but the invention is not limited to this, and it is also possible that the communication connector 50 is provided to be connectable with only one optional electronic device and the optional connection circuit part 32 is provided with a plurality of communication connectors 50. Even in this case, the communication of the plurality of optional electronic devices 10b and the ECU 20 can be multiplexed by choosing a communication protocol (for example, the above LIN or CAN) in which multiplex communication is possible as the communication protocol of the communication connectors 50 and the ECU 20.

In this embodiment, the standard electronic device control unit 22a and the optional electronic device control unit 22b are provided logically independently by using the CPU 22 commonly, but the invention is not limited to this. For example, two electronic boards, on which CPUs are mounted, may be mounted in the ECU 20, the standard electronic device control unit 22a is formed of the CPU mounted on one of the electronic boards and the optional electronic device control unit 22b is formed of the CPU mounted on the other electronic board, so that the standard electronic device control unit 22a and the optional electronic device control unit 22b are provided physically independently, respectively. In this case, it is possible that when only standard electronic devices 10a are mounted in a vehicle, the ECU 20 can be formed inexpensively by only mounting the above one of the electronic boards, and when optional electronic devices 10b are also mounted in the vehicle, the ECU 20 can be coped with by additionally mounting the other electronic board. Therefore, while one electronic board (namely, the standard electronic device control unit 22a) can be standardized, each of different combinations of optional electronic devices 10b can be coped with by the other electronic board (namely, the optional electronic device control unit 22b). Thus, while the cost can be reduced by standardization, the portions which require change can be physically collected in one place, and the design can be further improved.

In this embodiment, the standard electronic devices 10a and the ECU 20 are connected via the standard connection circuit part 31 so that 1 to 1 communication is possible, but the invention is not limited to this. The ECU 20 (namely, the standard electronic device control unit 22a) and the standard electronic devices 10a may be connected by multiplexing the communication, if a connector similar to the above communication connector 50 is provided instead of the standard electronic device connecting connector 36 of the standard connection circuit part 31. In this way, the circuit number of the standard connection circuit part 31 can be reduced.

Figure 4:
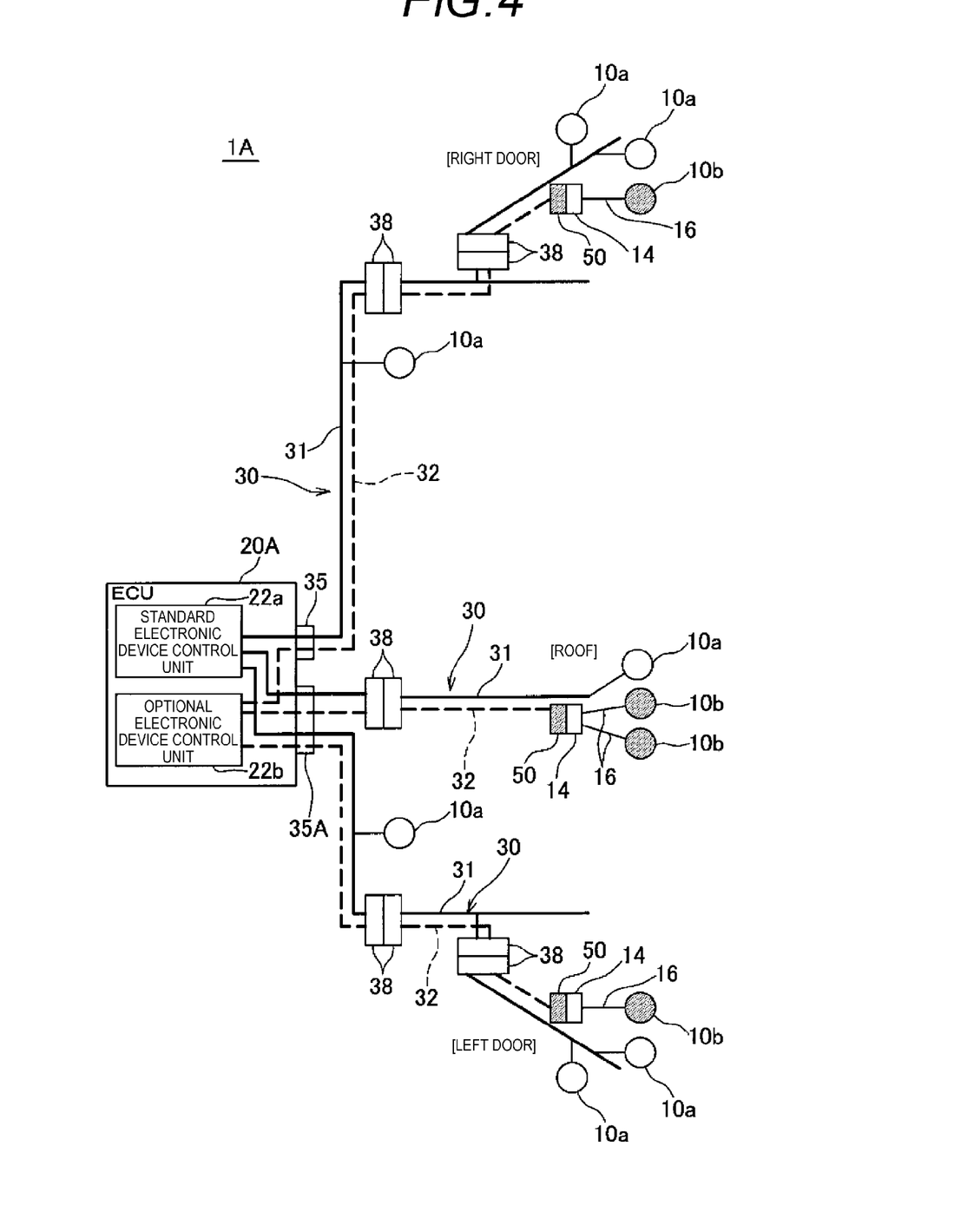
FIG. 4 is a diagram which explains a structure of a variation of the electronic device control system of FIG. 1.

In the embodiment mentioned above, in order to simplify the description of the invention, the connection of the electronic devices 10 provided near one door of a vehicle and the ECU 20 is explained as a representative example. However, as shown in FIG. 4, in an actual vehicle, an electronic device control system (shown as a symbol 1A in FIG. 4) connects electronic device 10, which are not near one door but scattered in the vehicle, and the ECU 20A respectively by using a plurality of wire harnesses 30. For each of the plurality of wire harnesses 30, the MPU 21 of the ECU 20A is provided with two communication interfaces (a standard connection circuit part 31, and an optional connection circuit part 32). While the wire harnesses 30 are connected to the ECU 20 respectively through ECU connection connectors 35 and 35A, in the ECU 20A, the standard connection circuit part 31 in each wire harness 30 is connected to the standard electronic device control unit 22a, and the optional connection circuit part 32 in each wire harness 30 is connected to the optional electronic device control unit 22b.

Figure 5:
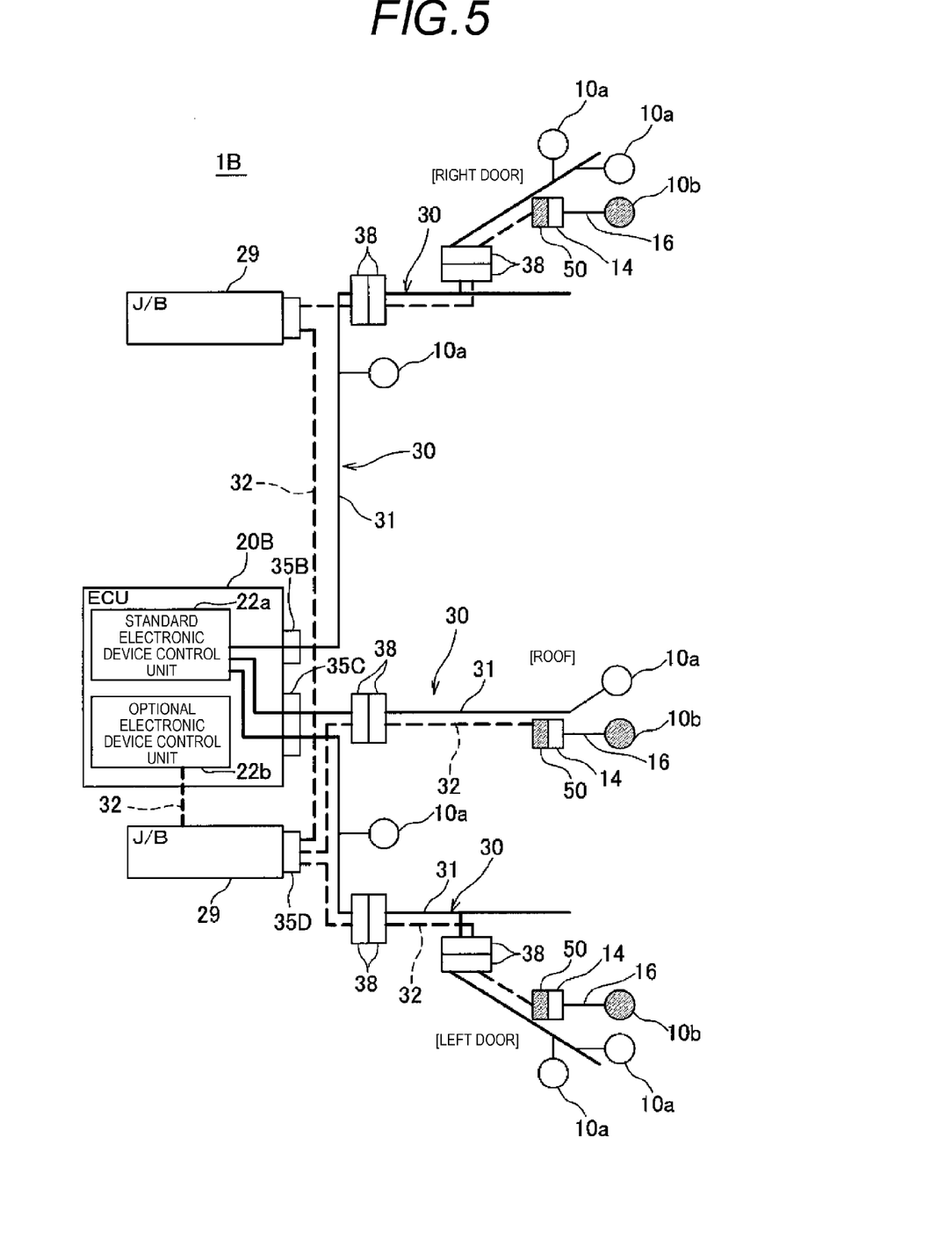
FIG. 5 is a diagram which explains a structure of another variation of the electronic device control system of FIG. 1.

It is also possible to connect the optional connection circuit parts 32 in the plurality of wire harnesses 30 to an ECU 20B via junction boxes (J/C) 29 like an electronic device control system 1B shown in FIG. 5. In this way, the common circuits (namely, signal lines of the same function) in the plurality of optional connection circuit parts 32 are electrically mutually connected in the junction box 29, so that these common circuits can be connected with the ECU 20B (namely, MPU 21) as one optional connection circuit part 32. Thus, a plurality of optional electronic devices 10b connected to different wire harnesses 30 can form one multiplex communication set which is connected to the one optional connection circuit part 32. Therefore, the communication interfaces for the optional connection circuit parts 32 can be reduced. Since the number of the communication interfaces required for control is reduced, the structure of the optional electronic device control unit 22b can be further simplified, and the design can be improved. The optional connection circuit part 32 is electrically connected between the ECU 20B and the junction box 29 through a pair of connectors or a wire harness which is provided at the side surfaces of the casing. In FIG. 4 and FIG. 5, the connection connectors 13 and the cables 15 with which the standard electronic device connecting connector 36 and the standard electronic device unit 11 are provided are omitted.

The above described embodiments are only representative embodiments of the invention, and the invention is not limited to the above embodiments. That is, various modifications can be made without departing from the spirit and scope of the invention.

Although the present invention is described in detail with reference to the embodiments, it is apparent that various modifications and amendments may be made by those skilled in the art without departing from the spirit and scope of the invention.

This application is based on the Japanese patent application (Patent Application No. 2009-247543) filed on Oct. 28, 2009, whose contents are incorporated herein by reference.

REFERENCE SIGNS LIST 1, 1A and 1B: electronic device control system
10: electronic device
10a: standard electronic device
10b: optional electronic device
20, 20A and 20B: electronic control unit (ECU)
21: MPU
22: CPU (standard electronic device control unit, optional electronic device control unit)
30: wire harness
31: standard connection circuit part
311: standard circuit
32: optional connection circuit part
321: optional circuit (connection circuit)
36: standard electronic device connecting connector
50: optional electronic device connecting connector communication connector)

The invention claimed is:

1. A wire harness for communicably connecting a plurality of electronic devices which are mounted in a vehicle and an electronic control unit which controls the electronic devices, the wire harness comprising:
a standard connection circuit part which connects the electronic control unit and a standard electronic device which is mounted in the vehicle among the plurality of electronic devices; and
non-standard connection circuit part which connects the electronic control unit and non-standard electronic devices which are mounted in the vehicle among the plurality of electronic devices, wherein
the non-standard connection circuit part includes a communication connector which is provided to be connectable to one or more of the non-standard electronic devices, and a connection circuit which connects the communication connector to the electronic control unit, and
the communication connector is configured to perform multiplex communication which multiplexes communication of the one or more of the non-standard electronic devices which are connected to the communication connector and the electronic control unit, with the electronic control unit via the connection circuit, and
the multiplexed communications are received by the electronic control unit via one transmission line.

2. An electronic device control system which includes a plurality of electronic devices mounted in a vehicle, an electronic control unit which controls the plurality of electronic devices, and a wire harness which communicably connects the plurality of electronic devices and the electronic control unit, wherein the wire harness comprises the wire harness as defined in claim 1, the electronic control unit includes a standard electronic device control unit which controls the standard electronic devices, and a non-standard electronic device control unit which controls the non-standard electronic devices, the standard electronic device control unit is connected with the standard electronic devices through the standard connection circuit part, and the non-standard electronic device control unit is connected with the non-standard electronic devices through the non-standard connection circuit part.

3. The wire harness according to claim 1, wherein the standard electronic device is directly connected to the electronic control unit via the standard connection circuit part, and the non-standard electronic devices are indirectly connected to the electronic control unit via the communication connector provided in the non-standard connection circuit part.

4. A wire harness for communicably connecting a plurality of electronic devices which are mounted in a vehicle and an electronic control unit which controls the electronic devices, the wire harness comprising:

a first connection circuit part which includes a first wiring path directly connecting the electronic control unit and at least one first electronic device which is mounted in the vehicle among the plurality of electronic devices; and a second connection circuit part which includes a second wiring path indirectly connecting the electronic control unit and second electronic devices which are mounted in the vehicle among the plurality of electronic devices, wherein the second connection circuit part includes a communication connector which is provided in the second wiring path to be connectable to one or more of the second electronic devices, wherein the second wiring path includes a connection circuit which connects the communication connector to the electronic control unit and a connection line which connects the communication connector to each of the second electronic devices, and the communication connector is configured to perform multiplex communication which multiplexes communication of the second electronic devices with the electronic control unit via the connection circuit, and the multiplexed communications are received by the electronic control unit via one transmission line.

* * * * *